Aug. 15, 1939.   A. A. KUCHER   2,169,919
REFRIGERATING APPARATUS
Filed Dec. 29, 1934   3 Sheets-Sheet 1

INVENTOR.
ANDREW A. KUCHER
BY
ATTORNEY.

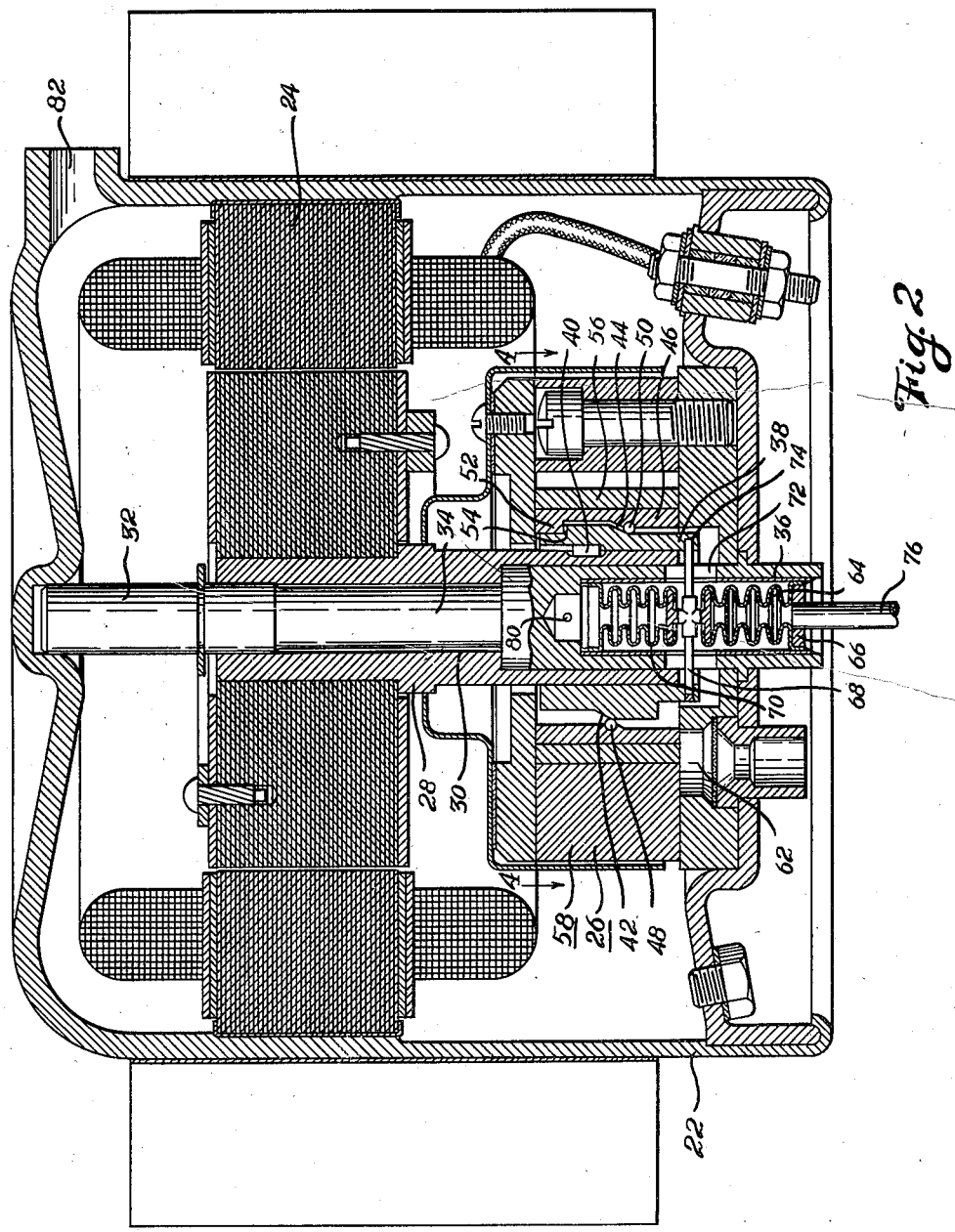

Aug. 15, 1939.   A. A. KUCHER   2,169,919
REFRIGERATING APPARATUS
Filed Dec. 29, 1934   3 Sheets-Sheet 3

INVENTOR.
ANDREW A. KUCHER
BY
ATTORNEY.

Patented Aug. 15, 1939

2,169,919

UNITED STATES PATENT OFFICE 2,169,919

REFRIGERATING APPARATUS

Andrew A. Kucher, Dayton, Ohio, assignor to General Motors Corporation, Dayton, Ohio, a corporation of Delaware Application December 29, 1934, Serial No. 759,759

11 Claims. (Cl. 62—115)

This invention relates to refrigerating apparatus and more particularly to a novel system and control therefor for automatically varying the refrigeration output of the apparatus.

Heretofore in the construction of refrigerators, particularly those comprising a cabinet having a food storage compartment and which are intended principally for household use, in meeting the problem of varying the refrigeration output of the machine to provide substantially constant food preserving temperatures in the cabinet, it has been customary to provide an automatic switch for stopping and starting the refrigerant liquefying unit as by controlling the motor which drives the compressor and to thus operate the apparatus intermittently. With such a method of control, the system, while it is operating, produces refrigeration at a substantially constant rate and the variation in average amount of refrigerant produced over a given period results in variations in the lengths of the period during which the machine operates or is idle. A refrigerating apparatus of this character has certain disadvantages, among them being high first cost and frequent service difficulties, together with certain difficulties arising from the continued stopping and starting of the refrigerant liquefying unit, particularly with liquefying units of the compression type.

It is an object, therefore, of the present invention to provide a refrigerating apparatus which is readily adapted to extremely low cost production and in which the difficulties inherent in an intermittently operated refrigerator are avoided.

It is a further object of the invention to provide a refrigerating apparatus in which automatic control of the output of the apparatus is attained while the refrigerant liquefying unit is constantly running.

It is also an object of the invention to provide a refrigerating apparatus in which the liquefying unit runs continuously throughout a substantial range of room temperatures normally encountered and in which substantially constant temperatures are maintained in the food preserving or other compartment to be cooled solely by varying the output of the compressor by means of a temperature responsive control for altering the cooperative action of the compressing elements.

Further objects and advantages of the present invention will be apparent from the following description, reference being had to the accompanying drawings, wherein a preferred form of the present invention is clearly shown.

In the drawings:

Referring now to the drawings, Fig. 1 illustrates a vertical cross section of a refrigerator cabinet embodying one form of the present invention;

Fig. 2 is a vertical cross section on line 2—2 of Fig. 4 showing a compressor adapted for use with the present invention;

Figure 1:
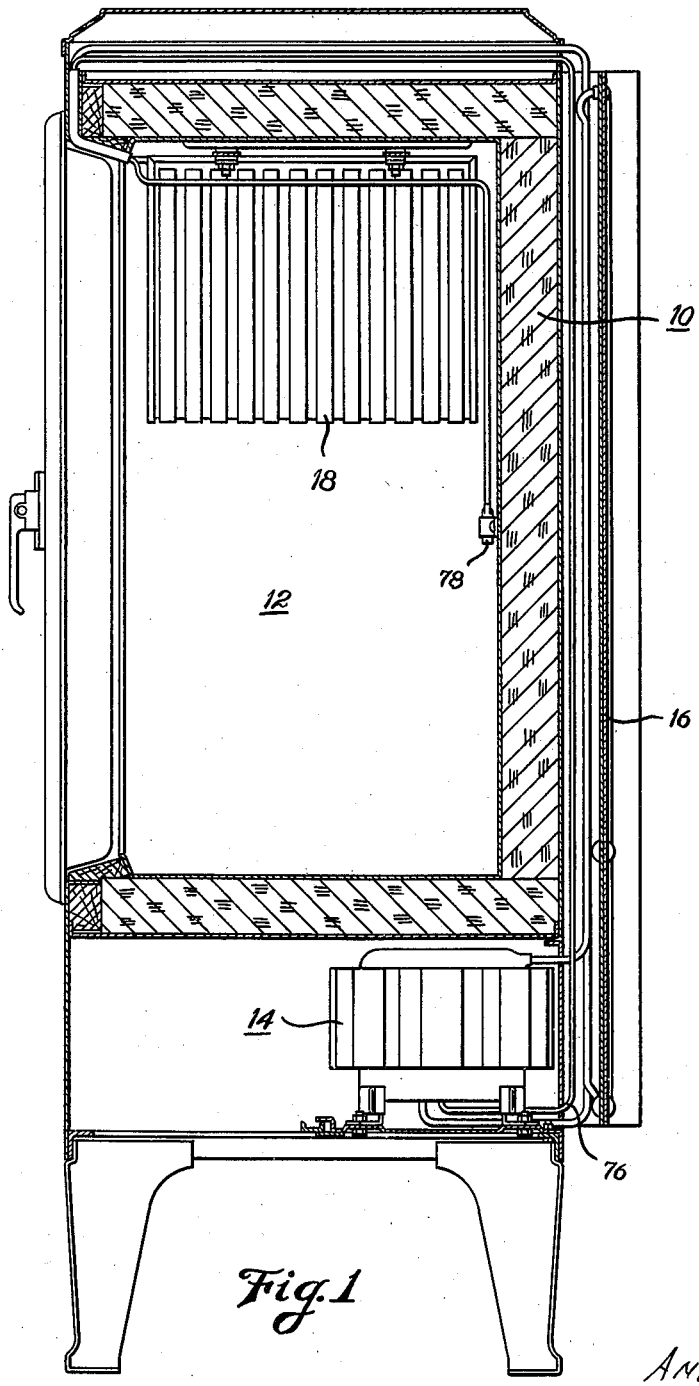

In the form of the invention illustrated in Fig. 1, there is provided a refrigerator cabinet generally designated as 10 having a food compartment 12 in which substantially constant temperatures are to be maintained throughout a wide range of room temperatures. For example, in an ordinary household refrigerator, it is desirable to maintain a temperature within the compartment 12 between substantially 42° and 50° F., while room temperatures may run as high as 110° F. and are generally not below 60° F. Associated with the cabinet 10 is a refrigerant liquefying unit comprising a compressor 14, and a condenser 16, both of which may take any of numerous suitable forms in order to maintain a constant supply of liquefied refrigerant for use in the system. Within the compartment 12, thre is mounted a refrigerant evaporator 18 for cooling the air within the compartment 12, and which may also be provided with means for freezing water as is well known in the art. Suitable means (not shown) for controlling the flow of liquid refrigerant from the liquefying unit to the evaporator are provided and may comprise a fixed restrictor or other refrigerant control device. The elements so far described are connected in series by suitable refrigerant conduits in the well known manner to provide a closed refrigerant circuit. The elements of the refrigerating system including the refrigerant liquefying unit, the liquid refrigerant control device and the evaporator are preferably so proportioned and coordinated with each other as to provide a maximum refrigeration output not substantially in excess of the heat load requirements of the cabinet under the highest room temperature normally encountered.

Figure 5:
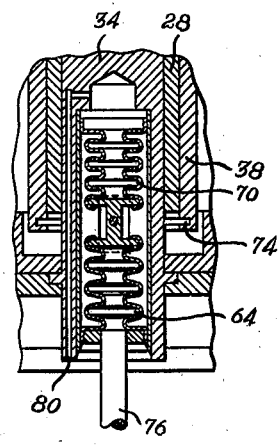
Fig. 5 is a fragmentary cross section on line 5—5 of Fig. 4.
Figure 4:
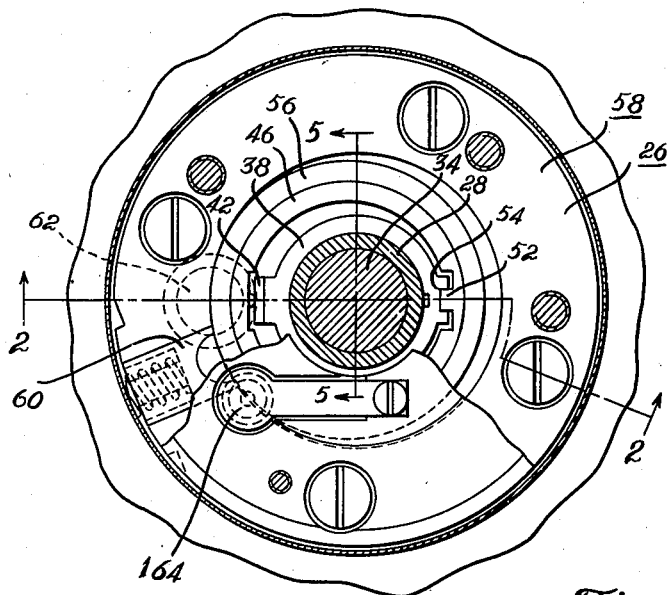
Fig. 4 is a horizontal cross section on line 4—4 of Fig. 2.

Referring now to Fig. 2, there is illustrated the internal construction of the motor-compressor unit illustrated in Fig. 1 and which comprises a hermetically sealed casing 22 within which is positioned an electric motor 24 and a rotary compressor 26 having a common drive shaft 28 provided with a central bore 30 by which the shaft 28 is journaled on a stationary shaft 32 positioned centrally in the housing 22. The shaft 32 is provided with an enlarged portion 34 at its lower end within which is formed a bore 36, open at the bottom for the reception of a compressor control mechanism. Mounted on the lower end of the shaft 28 is a cam sleeve 38 secured to the shaft 28 by a key 40 so that the sleeve 38 may slide up and down on the shaft 28 without rotating relative thereto. The sleeve 38 is provided at diametrically opposite points on its outer periphery with inclined cam portions 42 and 44 for a purpose later to be described. The cam sleeve 38 is surrounded by an eccentric 46 having anti-friction cam followers 48 and 50 adapted to cooperate with the cams 42 and 44 respectively. The eccentric 46 has a key portion 52 cooperating with a key way 54 formed in the cam sleeve 38 on its upper portion by which the eccentric 46 and the sleeve 38 are compelled to rotate in unison. Surrounding the eccentric 46 is a cylindrical impeller member 56 rotatably mounted upon the external surface of the eccentric 46. A compressor body generally designated as 58 and built up from a plurality of pieces surrounds the impeller 56 and forms a cylindrical compression chamber within which the impeller 56 may planetate in the well known manner. A divider block 60 (Fig. 4) is slidably mounted in a slot formed in the compressor body to divide the compression chamber into a suction space and a compression space. An inlet passage 62 communicates with the suction space adjacent one side of the divider block, while at the upper portion of the compressor body, a valved outlet 164 communicates with the compression space adjacent the other side of the divider block. Within the bore 36 of the stationary shaft 32, there is mounted a control mechanism comprising a bellows 64 having its lower end sealed to a plate 66 closing the lower end of the bore 36 and having its upper end secured to a movable cross rod 68. At the upper end of the bore 36, there is provided an equivalent bellows 70 having its upper end sealed to the bore 36 and its lower end secured to the movable cross rod 68. The cross rod 68 extends through slots 72 to engage an annular groove 74 formed in the internal surface of the cam sleeve 38. A pressure conduit 76 communicates with the inside of the bellows 64 and is connected at its opposite end to a temperature responsive bulb 78 (Fig. 1) positioned within the compartment 12 of the cabinet. The bulb 78, conduit 76 and bellows 64 are charged with a volatile fluid in a manner to cause the bellows to expand and contract with changes in temperature in the compartment 12. A bore 80 communicates between the interior of the bellows 70 and the atmosphere outside the sealed housing 22 (see Fig. 5).

Figure 3:
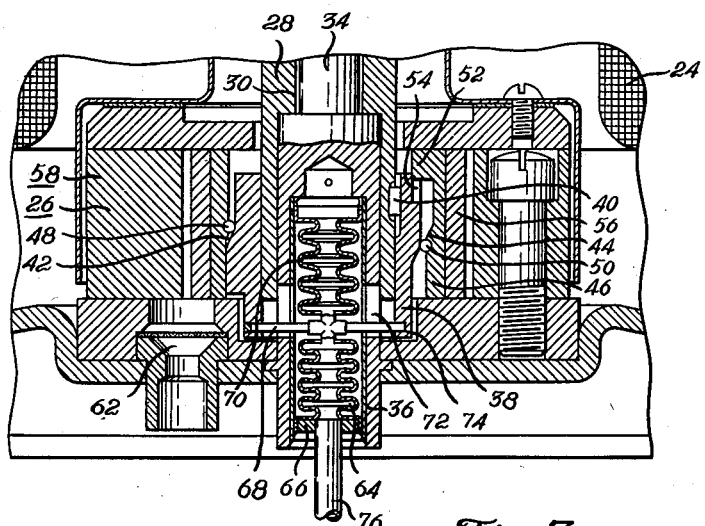
Fig. 3 is a fragmentary view corresponding to Fig. 2 showing the parts in another position.

In operation, the motor 24 being connected to a suitable source of electric energy causes the shaft 28 to rotate carrying with it the cam sleeve 38 and eccentric 46. When the temperature within the food compartment 12 is above the maximum desirable temperature, the bellows 64 expands and through the medium of the cross rod 68, the cam sleeve 38 is maintained in the position shown in Fig. 2. The relative eccentricity of the cam surfaces 42 and 44 and the cam followers 48 and 50 are such that with the cam sleeve 38 in the uppermost position, the eccentric 46 has an eccentricity sufficient to cause the impeller 56 to planetate within the compression chamber with the maximum permissible stroke. In other words, under these conditions, the impeller 56 rolls around the inner wall of the compression chamber, drawing evaporated refrigerant through the inlet 62 and expelling compressed refrigerant through the outlet 64 for delivery through the outlet 82 to the condenser 16. Under these conditions, the operation of the device is identical to that of any rotary compressor of the general type illustrated. Compressed refrigerant is liquefied in the condenser 16 and delivered through the liquid refrigerant control device to the evaporator 18 where the refrigerant vaporizes to be returned to the compressor in the well known manner. As soon as sufficient heat has been withdrawn by the evaporator 18 from the air in compartment 12 to bring its temperature into the desired range, the bellows 64 contracts slightly, tending to lower the position of the cam sleeve 38. The extreme lower position of the cam sleeve 38 is illustrated in Fig. 3 wherein the eccentric 46 has been brought to a position concentric with the axis of the shaft 28. In this position, the compressor has a zero stroke, and consequently no compression of refrigerant takes place. It will be understood that the condition illustrated in Fig. 3 is reached only at the time when conditions in the compartment 12 are such that no refrigeration whatever is required. At other times, the parts may take any of various positions intermediate the position of Fig. 2 and the position of Fig. 3 so that the effective stroke of the compressor will be varied to correspond to the refrigeration requirements in compartment 12. It will be noted that the interior of the housing 22 is subject to the head or high side pressure of the system and in order to eliminate its effect upon the bellows 64, the equivalent bellows 70 is provided. Inasmuch as the bellows 64 is subjected to the head pressure in a downward direction and the bellows 70 is subjected to the head pressure in an upward direction, the effective pressure on the exterior of the bellows 64 is equal to the pressure inside the bellows 70 which is, of course, atmospheric.

It will be noted that the refrigerant liquefying unit is maintained in continuous operation and that the temperature of the air in compartment 12 is maintained substantially constant notwithstanding the continuous operation of the refrigerant liquefying unit. By this construction, it is possible to provide a refrigerating apparatus wherein the refrigerant liquefying unit runs continuously throughout substantially the entire range of room temperatures normally encountered, although if a thermostatic switch is provided, for controlling the motor-compressor 14, its cut-out point may be selected so as to provide intermittent operation of the liquefying unit below any desired room temperature less than maximum.

Thus, the present invention provides a refrigerating apparatus having means for maintaining the temperature of the compartment to be cooled within a predetermined range, while the refrigerating apparatus for the compartment is maintained in continuous operation.

While the form of embodiment of the present invention as herein disclosed constitutes a preferred form, it is to be understood that other forms might be adopted, all coming within the scope of the claims which follow.

What is claimed is as follows:

1. A refrigerating apparatus comprising in combination an evaporator, a condenser, a motor, a compressor operated by said motor, and thermostatic means for unloading and reloading the compressor to vary the heat absorbing capacity of said apparatus while the compressor runs at substantially constant speed, said means including a device for varying the stroke of the compressor.

2. A refrigerating apparatus comprising in combination an evaporator, a condenser, a motor, a compressor operated by said motor, and thermostatic means for unloading and reloading the compressor to vary the heat absorbing capacity of said apparatus while the compressor runs at substantially constant speed, said means including a device for varying the compressing action of the compressor while maintaining communication from the compressing chamber to the intake of the compressor only through the condenser and the evaporator.

3. A pressure operated control device for a refrigerator compressor comprising an element movable inside the compressor and exposed to a pressure different from atmospheric, a flexible wall member connected to said element on one side and exposed to a variable control pressure on the other side, and flexible walled means for exerting a force on said flexible member equal to the difference between atmospheric pressure and the pressure to which said element is exposed.

4. A pressure operated control device for a refrigerator compressor comprising an element movable inside the compressor and exposed to a pressure different from atmospheric, a flexible wall member connected to said element on one side and exposed to a variable control pressure on the other side, and means for balancing the pressure difference between atmospheric pressure and the pressure to which said element is exposed.

5. A hermetically sealed motor-compressor unit comprising in combination relatively movable compressing elements, means for varying the ratio of compression, and pressure responsive means for controlling the first mentioned means from outside the unit, said pressure means being unaffected by pressure variations within the unit.

6. A refrigerating apparatus comprising in combination an evaporator, a condenser, a motor, a compressor operated by said motor, and thermostatic means for varying the displacement of the compressor to vary the refrigerating capacity of the apparatus while the compressor runs at a substantially constant speed.

7. Refrigerating apparatus comprising in combination evaporating means, condensing means, a sealed unit containing a compressor and a motor for driving the compressor, said compressor being connected in operative closed refrigerant circuit relation with said evaporating and condensing means, means for varying the capacity of said compressor including a pressure operated diaphragm means exposed upon one side to the pressure within the sealed unit and exposed on the other side to control pressures, a control system for applying said control pressures to said diaphragm means, and a compensating diaphragm means for said first mentioned diaphragm means.

8. Refrigerating apparatus comprising in combination evaporating means, condensing means, a sealed unit containing a compressor and a motor for driving the compressor, said compressor being connected in operative closed refrigerant circuit relation with said evaporating and condensing means, means for varying the capacity of said compressor including a pressure operated diaphragm means exposed upon one side to the pressure within the sealed unit and exposed on the other side to control pressures, a control system for applying said control pressures to said diaphragm means, and a compensating diaphragm means for said first mentioned diaphragm means, said compensating diaphragm means being exposed on one side to atmospheric pressure and being exposed on the other side to the pressure within said sealed unit, said compensating diaphragm being connected to said first mentioned diaphragm.

9. Refrigerating apparatus including an evaporator, a condenser, a motor, a compressor operated by said motor, and pressure operative means for varying the stroke of the compressor to vary the amount of refrigerant pumped by the compressor.

10. Refrigerating apparatus including an evaporator, a condenser, a motor, a compressor operated by said motor, and thermostatic means for varying the stroke of the compressor to vary the amount of refrigerant pumped by the compressor.

11. Refrigerating apparatus including a cabinet containing a compartment to be cooled, evaporator means in heat exchange relation with said compartment to be cooled, a condenser and a compressor connected in closed refrigerant circuit with said evaporator means, a motor for operating said compressor and means responsive to temperature within said compartment for varying the stroke of said compressor.

ANDREW A. KUCHER.